(12) United States Patent
Katz (10) Patent No.: US 7,024,065 B2
(45) Date of Patent: Apr. 4, 2006

(54) OPTICAL WAVEGUIDE DEVICE AND METHOD OF MANUFACTURE THEREFOR

(75) Inventor: Howard E. Katz, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 141 days.

(21) Appl. No.: 10/191,135

(22) Filed: Jul. 9, 2002

(65) Prior Publication Data

US 2004/0008961 A1    Jan. 15, 2004

(51) Int. Cl.
*G02B 6/12*   (2006.01)

(52) U.S. Cl. .......................... 385/14; 385/15; 385/16; 385/129

(58) Field of Classification Search ............ 385/14–16, 385/129; 156/244.12
See application file for complete search history.

(56) References Cited

U.S. PATENT DOCUMENTS

| | | |
|---|---|---|
| 3,997,687 A | 12/1976 | Phillips |
| 4,382,978 A | 5/1983 | Chen |
| 4,970,129 A | 11/1990 | Ingwall et al. |
| 5,015,066 A | 5/1991 | Cressman |
| 5,115,512 A | 5/1992 | Fujiwara et al. |
| 5,313,545 A * | 5/1994 | Kuo et al. .................. 385/129 |
| 5,511,142 A * | 4/1996 | Horie et al. ................ 385/129 |
| 5,534,101 A * | 7/1996 | Keyworth et al. ...... 156/244.12 |
| 5,698,140 A * | 12/1997 | Lamb et al. ................ 252/502 |
| 5,698,345 A | 12/1997 | Ohe et al. |
| 5,896,483 A * | 4/1999 | Wojcik et al. ............... 385/125 |
| 6,170,996 B1 * | 1/2001 | Miura et al. .................. 385/94 |
| 6,236,774 B1 * | 5/2001 | Lackritz et al. ............... 385/14 |
| 6,599,957 B1 * | 7/2003 | Dawes et al. ............... 522/149 |
| 2002/0018634 A1 * | 2/2002 | Korenaga et al. ........... 385/132 |
| 2002/0041726 A1 * | 4/2002 | Thackara ..................... 385/16 |
| 2002/0123806 A1 * | 9/2002 | Reiley ..................... 623/17.11 |
| 2003/0044153 A1 * | 3/2003 | Bazylenko .................. 385/129 |
| 2004/0005132 A1 * | 1/2004 | Erben et al. ................ 385/129 |

FOREIGN PATENT DOCUMENTS

| | | |
|---|---|---|
| FR | 2667073 A1 | 3/1992 |
| JP | SHO591984 -71004 | 4/1984 |
| JP | 02111902 | * 4/1990 |
| JP | 200352627 | * 12/2000 |

OTHER PUBLICATIONS

L.B. Glebov, K.V. Dukel'skii, S.K. Evstrop'ev, N.V. Kikonorov, G.T. Petrovski and V.S. Shashkin; "Photorefraction in Porous Xerogel-Photopolymer Composite Materials"; American Institute of Physics, Sov. Tech. Phys. Lett. 16(6), Jun. 1990, Pgs. 445-446.

* cited by examiner

*Primary Examiner*—Karl D. Frech
*Assistant Examiner*—Allyson N Trail (57) ABSTRACT

The present invention provides an optical waveguide device, a method for manufacturing an optical waveguide device, and a method for manufacturing an optical communications device. In an advantageous embodiment, the optical waveguide device includes a contrasting material located within an optical substrate. The contrasting material, thus, forms at least a portion of the optical core.

26 Claims, 6 Drawing Sheets

OPTICAL WAVEGUIDE DEVICE AND METHOD OF MANUFACTURE THEREFOR

TECHNICAL FIELD OF THE INVENTION

The present invention is directed, in general, to an optical device and, more specifically, to an optical waveguide device, a method of manufacture therefor, and a method for manufacturing an optical communications device.

BACKGROUND OF THE INVENTION

Discrete optoelectronic devices have recently become the key to optical telecommunications, data processing and sensing systems. To meet today's stringent requirements for information transmission and processing capacity, optoelectronic devices need to be configured to provide higher performance, particularly with regards to reliability, than those in the past. At the same time, however, the devices should maintain their relatively low manufacturing cost.

Optoelectronic integrated circuits are thin-film type integrated circuits that integrate multiple optical and electronic components on a single substrate. Through such integration, a more compact, stable and functional optoelectronic system can be produced. Optoelectronic integrated circuits typically integrate laser diode light sources, switches/modulators/couplers, interconnecting waveguides and photodiode detectors, along with traditional electronic integrated components, on a common substrate.

The integration of lasers and photo detectors with other optical signal processing circuits, by the use of waveguides, produces useful components that embody advanced optical signal processing functions. The integration of waveguides in circuits using semiconductor or dielectric materials is typically referred to as integrated optics or optical integrated circuits. More recent integration of various waveguide-based devices and optoelectronic conversion devices on a common substrate, is typically referred to as photonic integrated circuits.

The integration of optoelectronic devices with electronic circuits on a single substrate has many advantages. For instance, it typically reduces parasitic resistance that occurs between electrical interconnections. Furthermore, the number of fiber optic elements and interconnections can be reduced by monolithic integration of optoelectronic components. This enables integrated circuits to be manufactured with improved compactness as well as improved speed and noise characteristics. Among others, these advantages make optoelectronic integrated circuits useful in very high-speed telecommunications and coherent optical telecommunications systems.

The use of optoelectronic integrated circuits does, however, have certain requirements. One of those requirements is the need for easily and inexpensively manufacturing the integrated waveguide required to couple the various optical devices of the optoelectronic integrated circuit. Presently, virtually all known methods for manufacturing the integrated waveguides require the use of photolithographic masks to define the waveguide. For example, in one well-known process, a photolithographic mask is used to control the diffusion of gas/ion particles (i.e., what eventually forms the waveguide) into a substrate. In another well-known process, the photolithographic mask is used to pattern a material, which is eventually diffused into the substrate to form the waveguide. Accordingly, in virtually all known methods for manufacturing the integrated waveguide, a photolithographic mask is used.

The process described above for forming the integrated waveguides is an expensive process. Much of the expense arises from the specialized tools required to form such waveguides. However, much of the expense also arises from the required use of photolithography. As those skilled in the art readily understand, manufacturing photolithographic masks is a very expensive process. This, combined with the inability to retrofit existing masks for a new process flow or device, results in an extremely expensive technique.

A need therefore exists in the art for a method of manufacturing a waveguide that does not experience the drawbacks associated with the prior art methods.

SUMMARY OF THE INVENTION

To address the above-discussed deficiencies of the prior art, the present invention provides an optical waveguide device, a method for manufacturing an optical waveguide device, and a method for manufacturing an optical communications device. In an advantageous embodiment, the optical waveguide device includes a contrasting material located within an optical substrate. The contrasting material, thus, forms at least a portion of the optical core.

In an exemplary embodiment, the method for manufacturing the optical communications device includes the step of providing an optical substrate. After providing the optical substrate, the method includes placing a liquid onto the optical substrate and allowing the liquid to infiltrate the optical substrate to form an optical core.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The invention is best understood from the following detailed description when read with the accompanying FIGUREs. It is emphasized that in accordance with the standard practice in the optics industry, various features may not be drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1:
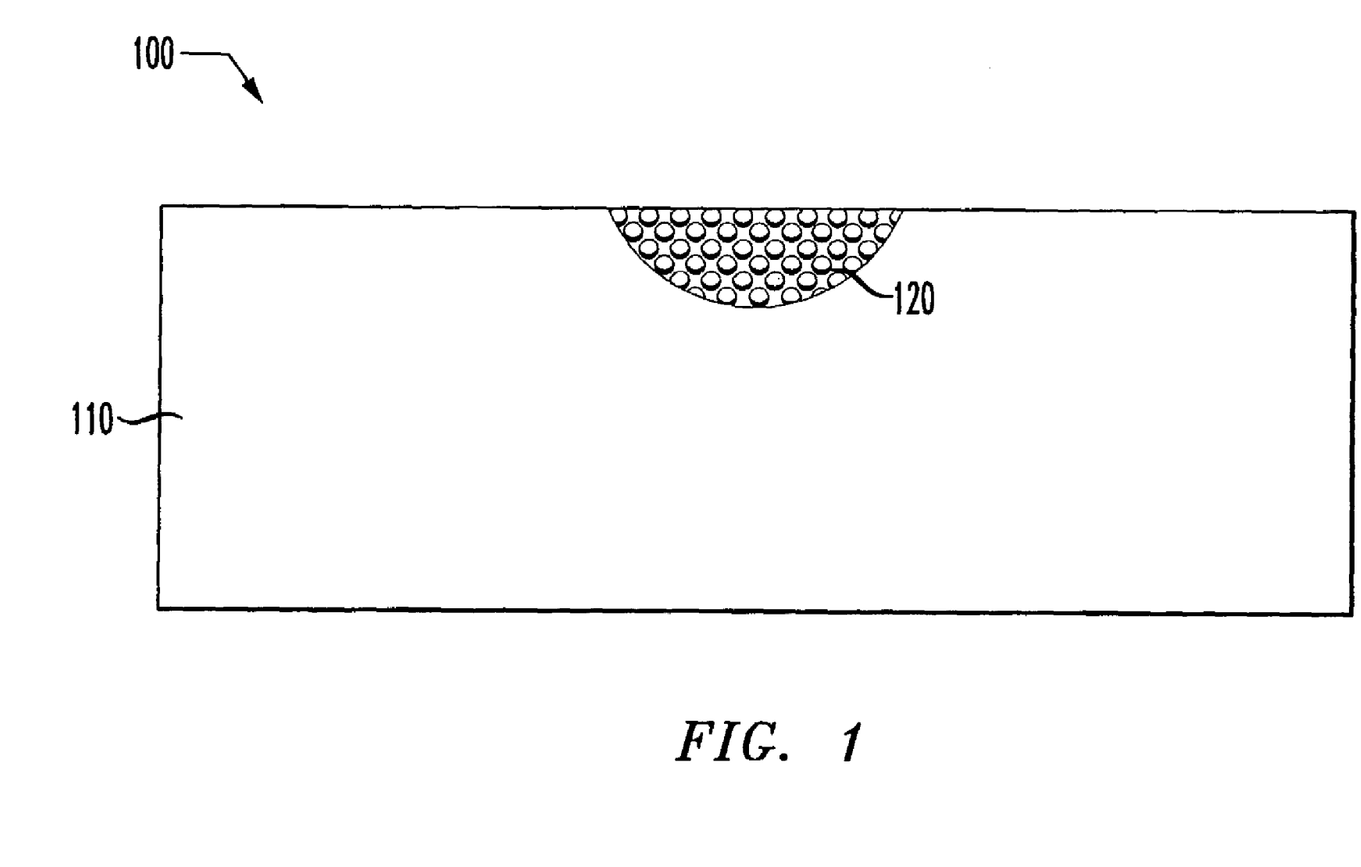
FIG. 1 illustrates a cross-sectional view of one embodiment of an optical waveguide device manufactured in accordance with the principles of the present invention.

Referring initially to FIG. 1, illustrated is a cross-sectional view of one embodiment of an optical waveguide device 100 manufactured in accordance with the principles of the present invention. In the particular embodiment shown in FIG. 1, the optical waveguide device 100 includes an optical substrate 110 that has an index of refraction associated therewith. As one skilled in the art readily understands, the index of refraction of the optical substrate 110 depends on its material composition.

The optical substrate 110 may comprise a number of different materials while staying within the scope of the present invention. For instance, in one exemplary embodiment the optical substrate 110 comprises an inorganic material, such as a derived porous silica material, vycor® material or a xerogel material. Additional information regarding the derived porous silica material may be found in patent application Ser. No. 09/353,898, filed on Jul. 15, 1999, and entitled "SILICATE MATERIAL AND PROCESS FOR FABRICATING SILICATE MATERIAL," which is incorporated in its entirety herein by reference.

It should be noted that other materials of organic nature, are also within the scope of the present invention. Nonetheless, whether the material is organic or inorganic in nature, the pores can be either disordered or ordered, depending on the particular use of the waveguide. As another example, polymers with poorly packed or irregular shaped subunits can comprise the optical substrate 110.

It is particularly beneficial if the optical substrate 110 comprises a free-volume material. A free-volume material, for purposes of the present discussion, is defined as any material that is not a dense crystal. It is believed that swellable materials and porous materials are particularly beneficial for use as the optical substrate 110. If used, the porosity of the porous material may vary greatly. It is desired that the pores be large and interconnected enough for the transfer of additional media, however, especially in the case where the pores are disordered, small enough to ensure low scattering loss. For example, materials having a porosity between about 20% and about 80%, are believed to work well. The portion of the optical substrate 110 that is not free-volume may be referred to as the solid portion of the optical substrate 110.

The optical waveguide device 100 shown in FIG. 1 further includes an optical core 120 located within the optical substrate 110. In the embodiment shown, the optical core 120 comprises a contrasting material, which as a composite with the optical substrate, has an index of refraction greater than the index of refraction of the optical substrate 110. The term contrasting material, as used herein, means any material which alters the refractive index or reflectivity of the optical substrate 110. As shown, the optical substrate 110 and the air surrounding the optical core 120 perform as an optical cladding for the optical core 120. Accordingly, photons imparted on the optical core 120 should be substantially confined thereto.

The optical core 120 may comprise many different materials while staying within the scope of the present invention, however, in one particular embodiment the optical core 120 comprises a polymerized material. For example, the polymerized material may comprise a polymerized epoxy, a polymethacrylate, a polyacrylate, polystyrene, a polyisocyanate, polymerized trifluorovinyloxy or another similar material. Other materials, however, may also be used. As another example, the optical core may comprise a material that is a flowing liquid at elevated temperatures but non-flowing liquid at the operating temperatures. For example, siloxane or polyethyleneoxide oligomers of appropriate molecular weight could be used for this specific embodiment. However, while most of the previous examples were organic in nature other inorganic compounds are within the scope of the present invention (e.g., silicic acid).

The size of the optical core 120 may vary greatly depending on the application intended for the optical waveguide device 100. For example, in one particularly useful embodiment a width of the optical core 120 ranges from about 0.5 µm to about 50 µm, with a narrower range being from about 1 µm to about 10 µm. While specifics have been given for the size of the optical core 120, they have been given for illustrative purposes only, and should not be used to limit the scope of the present invention.

Figure 2:
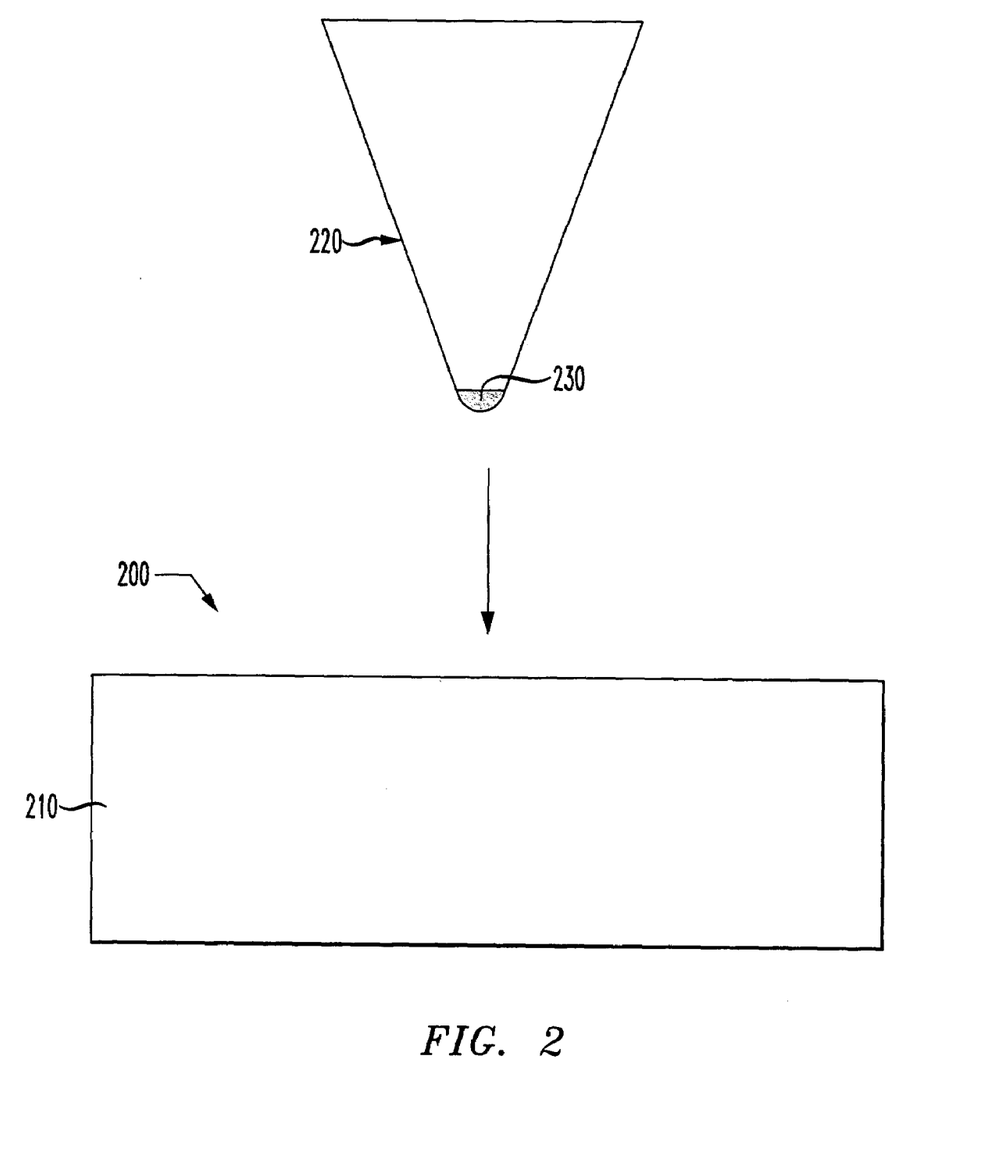
FIG. 2 illustrates a cross-sectional view of an optical waveguide device at an initial stage of manufacture, in accordance with the principles of the present invention, in which a liquid dispensing device is positioned over the substrate.
Figure 3:
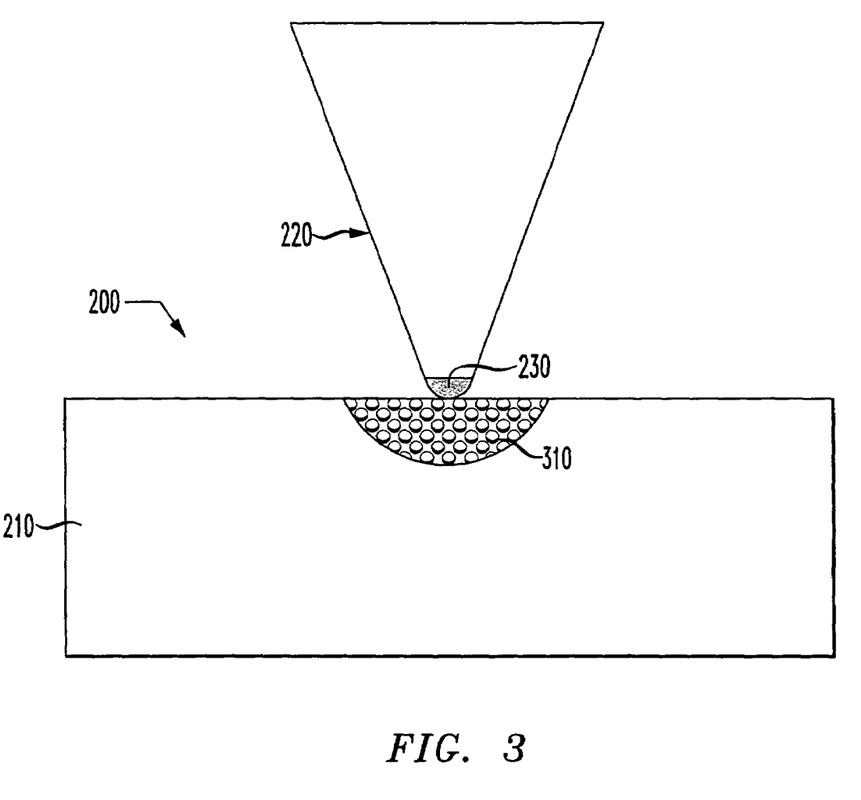
FIG. 3 illustrates a cross-sectional view of the partially completed optical waveguide device illustrated in FIG. 2, as a liquid is being placed onto the optical substrate.
Figure 4:
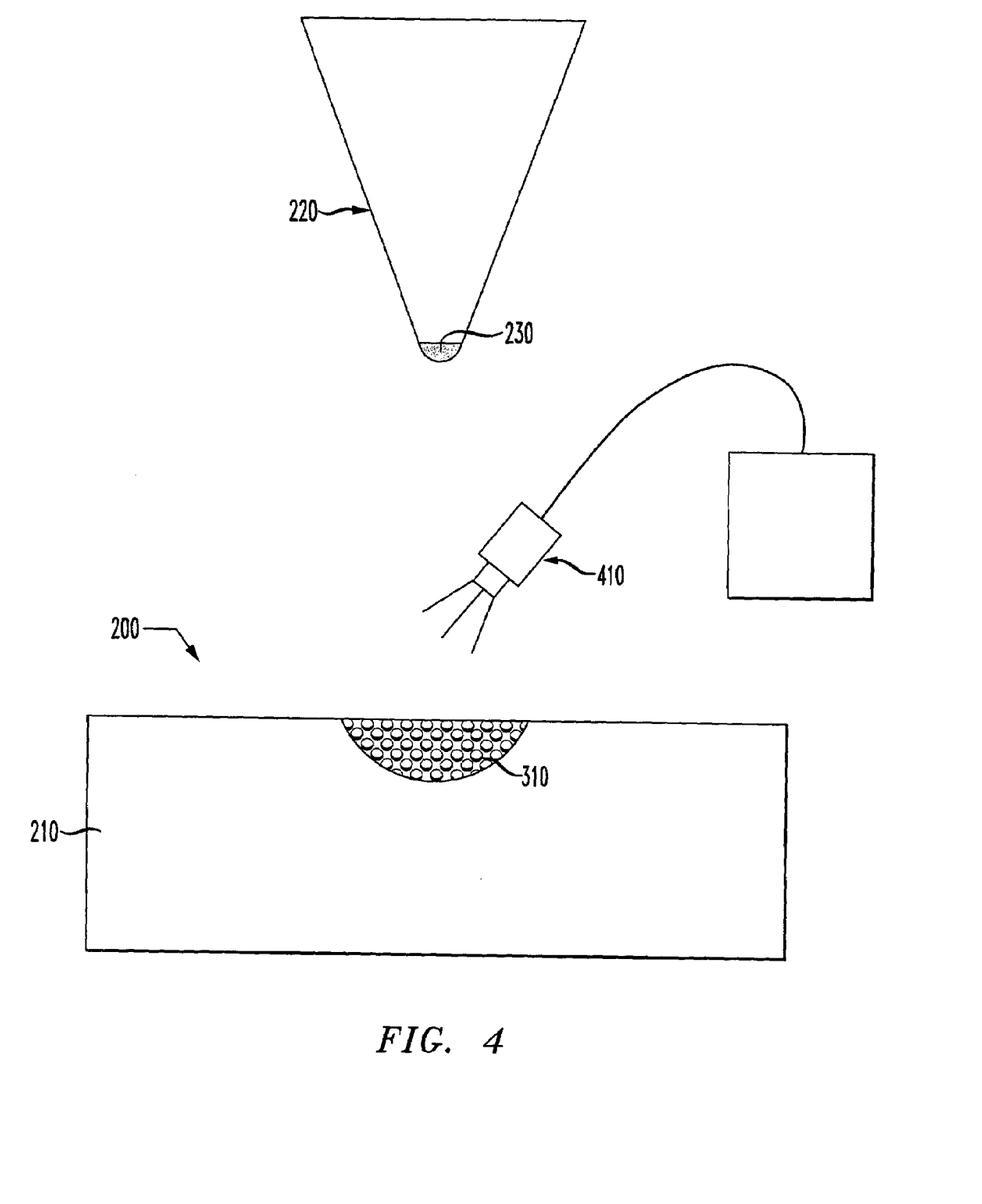
FIG. 4 illustrates a cross-sectional view of the partially completed optical waveguide device illustrated in FIG. 3, after the liquid within the optical core has been set by a source.

Turning now to FIGS. 2–4, illustrated are cross-sectional views of an optical waveguide device 200 at various stages of manufacture in accordance with the principles of the present invention. The partially completed optical waveguide device 200 illustrated in FIG. 2 includes an optical substrate 210 having a liquid dispensing device 220 located thereover.

Similar to above, the optical substrate 210 may comprise a variety of materials while staying within the scope of the present invention. It is particularly important, however, that the optical substrate 210 be capable of accepting another material, such as is the case with a swellable material or a porous material. In fact, a substantially non-free volume material, such as a dense crystal, could not be used for the optical substrate 210.

In the illustrative embodiment shown, the liquid dispensing device 220 contains an undetermined amount of liquid 230. Because the liquid dispensing device 220 may comprise a variety of different structures, the liquid 230 may either be located on the liquid dispensing device 220 or in the liquid dispensing device 220. As an example, in one particularly advantageous embodiment, the liquid dispensing device 220 is a stamp, and the liquid 230 is located on a surface of the stamp. In an alternative embodiment, however, the liquid dispensing device 220 is a reservoir having the liquid 230 located therein, much like a conventional fountain pen or a syringe. In each of the embodiments just discussed, the optical substrate 210 is not being soaked in the liquid 230, but the liquid 230 is being placed on a specified location of the optical substrate 210 and allowed to infiltrate therein, thus forming an optical core.

The material composition of the liquid 230 plays a substantial role in the operability of the optical waveguide device 200. It is often desired, however, that the liquid 230 once inside the optical substrate 210, as a composite with the optical substrate 210, has an index of refraction greater than an index of refraction of the optical substrate 210.

If the optical substrate 210 is reflective, it is possible to place the liquid 230 therein, causing that portion of the optical substrate 210 contacted by the liquid 230 to become transmissive. Such is the case when the optical substrate 210 comprises a photonic bandgap material and the liquid is index matched to the solid portion of the optical substrate 210.

The embodiment illustrated in FIG. 1, above, discussed that the liquid 230, or in that case the optical core 120, comprise an organic material. However, while this may be the case in the embodiment of FIGS. 2–4, it need not always be the case. Among other things, the liquid 230 may comprise a polymerizable material. Accordingly, similar to the optical core 120 of FIG. 1, the liquid 230 may comprise an epoxy, a methacrylate, an acrylate, styrene, an isocyanate, trifluorovinyloxy or another similar material. For example, the liquid 230 may be an organic monomer, or in the alternative, at least be comprised essentially of an organic monomer.

Turning now to FIG. 3, illustrated is a cross-sectional view of the partially completed optical waveguide device 200 illustrated in FIG. 2, as the liquid 230 is being placed onto the optical substrate 210. As illustrated, the liquid 230 is allowed to infiltrate the optical substrate 210, thereby forming an optical core 310. Those skilled in the art understand how the liquid 230 may infiltrate the optical substrate 210, including by capillary motion or another similar process.

In the particular embodiment shown in FIG. 3, the liquid 230 is placed onto the optical substrate 210 using the liquid dispensing device 220. In such an embodiment, the liquid dispensing device 220 could be advanced across a surface of the optical substrate 210 in a predetermined pattern, thereby, forming an optical core 310 having the predetermined pattern. Advantageously, the optical core 310 can be tailored to provide an extremely precise structure. Moreover, by advancing the liquid dispensing device 220 either faster or slower, the size (e.g., depth or width) of the optical core 310 can also be tailored.

Other, equally as beneficial processes, may also be used to form the optical core 310. For instance, a stamping process could be used to bring the liquid 230 in contact with the optical substrate 210, thus providing an optical core 310 resembling a shape of a pattern on the stamp. In this instance, the size (e.g., depth or width) of the optical core 310 can be tailored by changing the shape of the stamp's pattern, increasing the amount of time the stamp is in contact with the optical substrate 210, or changing the composition of the stamp, such that it releases more or less of the liquid 230. Another process that could be used to bring the liquid 230 in contact with the optical substrate 210 includes inkjet printing, among others.

The environmental conditions under which the liquid 230 is placed upon the optical substrate 210 and allowed to infiltrate the optical substrate 210 may have an impact on the formation of the optical core 310. For example, changing the temperature of the liquid 230 or optical substrate 210 during formation of the optical core 310 has the ability to change the viscosity of the liquid 230, and therefore, can either speed along or slow down the process. It has been found that maintaining the optical substrate 210 and/or liquid 230 at a temperature of less than about 200° C. can be quite beneficial. It should be noted, however, many other temperatures are within the scope of the present invention, including ambient temperature. Similarly, changing the pressure under which the optical core 310 is formed, may also alter the process.

Turning now to FIG. 4, illustrated is a cross-sectional view of the partially completed optical waveguide device 200 illustrated in FIG. 3, after the optical core 310 has been set by a source 410. Note, however, this is an optional step that is sometimes required and other times not required. In those instances where the liquid 230 used to form the optical core 310 has the ability to set on its own (e.g., after a specified period of time), and when the liquid 230, as a composite with the optical substrate 210, inherently has an index of refraction greater than that of the optical substrate 210, the following step illustrated and described with respect to FIG. 4 can be omitted.

Two or more situations do exist, however, where the step of setting the liquid 230, thus completing the optical core 310, might be desired. One situation exists, where the liquid 230, alone, does not have the ability to set itself and an external process for curing or setting the liquid 230 to form the optical core 310 is required. In this situation, but for the setting process, the liquid 230 might not remain in the correct position in the optical substrate 210. This would invariably result in an inoperable optical core 310.

Another situation exists wherein the liquid 230 as a composite with the optical substrate 210 material does not have an index of refraction greater than that of the optical substrate 210. In such a situation, an additional step (e.g., an irradiation step) may be used to increase the index of refraction of the composite of liquid 230 located within the optical substrate 210. This results in the optical core 310 having a higher index of refraction than the optical substrate 210. It is well known that the irradiation can initiate a polymerization reaction, for example, by means of a photoinitiator, thus forming a polymer that is of greater polarizability and/or density, and therefore greater refractive index than the liquid 230.

It is well known in the art that the source 410 might comprise a variety of structures furnishing a variety of setting techniques. For example, the source 410 could be capable of furnishing photochemistry to the optical substrate 210, a thermal treatment to the optical substrate 210, electrolysis to the optical substrate 210, or even the introduction of an additional reagent to the optical substrate 210. While certain examples of sources 410 and their associated functionality have been disclosed, those skilled in the art understand that any known or hereafter discovered source 410 consistent with the principles of the present invention, may be used.

Advantageously, the optical waveguide device in accordance with the principles of the present invention (e.g., that of FIG. 1, as well as that of FIGS. 2–4) can be manufactured easier and less expensively than the prior art devices. For one, not all embodiments of manufacturing the optical core 120, 310 of FIGS. 1 and 3, respectively, require the use of a photolithographic mask, as required in essentially all the prior art devices. As mentioned above, photolithography is a very expensive process. Also, the manufacturing process in accordance with the principles of the present invention is more precise and less time consuming than that of the prior art.

Figure 5:
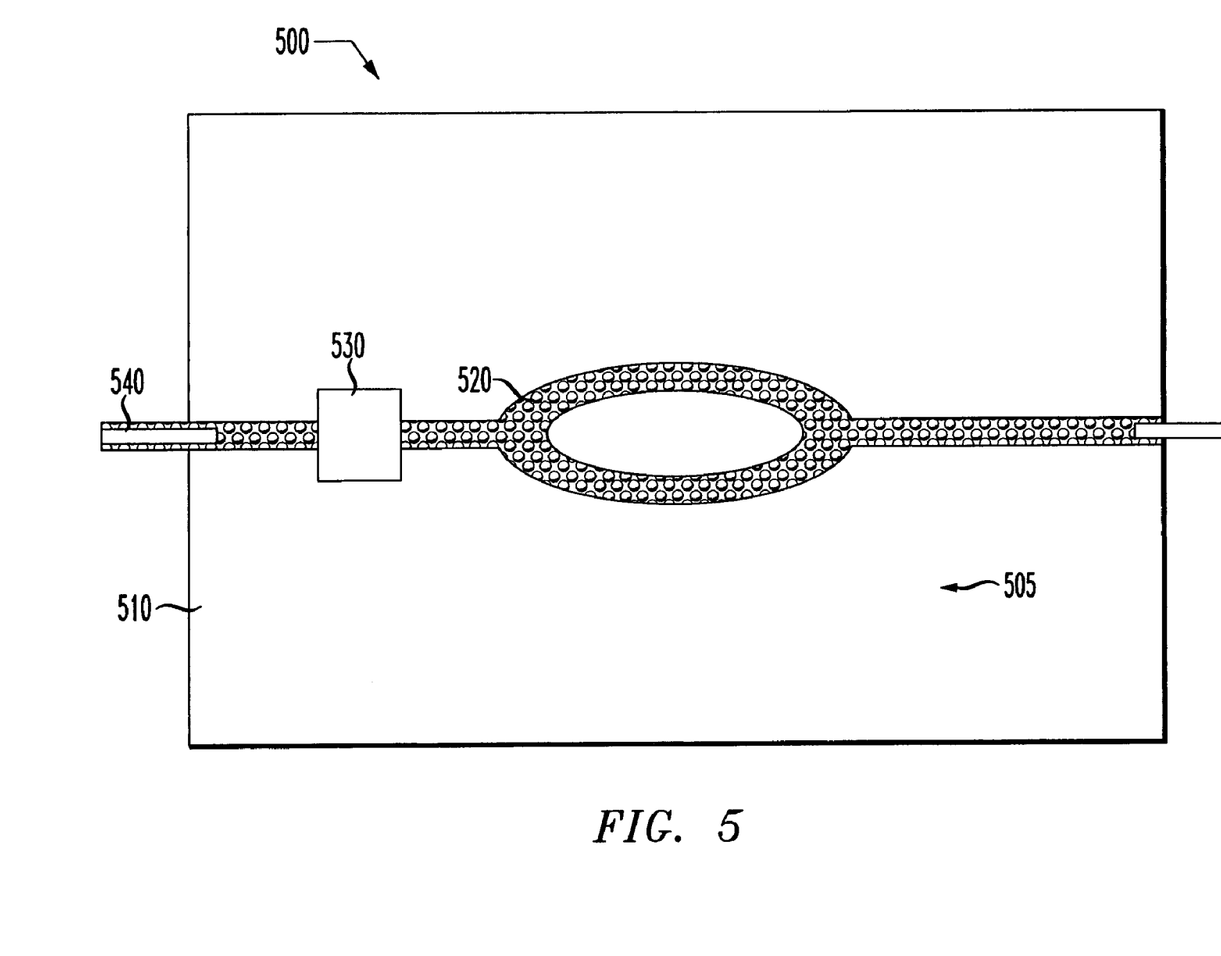
FIG. 5 illustrates a plan view of a completed optical communications device in accordance with the principles of the present invention.

Turning now to FIG. 5, illustrated is a plan view of a completed optical communications device 500 in accordance with the principles of the present invention. The optical communications device 500 of FIG. 5 includes an optical waveguide device 505, which includes an optical substrate 510 having an optical core 520 formed therein. In one advantageous embodiment, the optical core 520 is located near a surface of the optical substrate 510, such as shown. For example, the optical core can beneficially be formed within 10 μm of the surface of the optical substrate 510. The optical core 520 is similar to the optical cores 120, 310 of FIGS. 1 and 3, respectively.

Also illustrated in FIG. 5 is a second device 530 optically coupled to the optical waveguide device 505 and formed on the optical substrate 510. The second device 530 may comprise many different devices while staying within the scope of the present invention. In fact, the second device 530 may comprise a waveguide, a reflector, an emitter, an optical cavity, a laser, a light-emitting diode, a modulator, or another similar device.

In the illustrative embodiment shown, the optical waveguide device 505, and more specifically the optical core 520, has been used to form at least a portion of the second device 530. As an example, a reflective grating could be defined by periodic transformations of the optical core 520. Two such reflectors, suitably spaced, can also act as a cavity. Introduction of an emissive moiety (e.g., an erbium oxide) into the optical core 520 can presumably provide an amplifier function. If the emissive moiety is in a cavity, this can result in a laser.

Further, application of voltages to the emissive region, if the charge injection properties of the emitter are suitable, can provide a light-emitting diode. Introduction of an electro-optic medium in the optical core 520 and application of electrodes to supply an electric field to the optical core 520, may result in an electro-optic modulator. Such a modulator in a cavity forms a Fabry-Perot modulator. Accordingly, as just described, the optical waveguide device 505 forms at least a portion of the second device 530.

Figure 6:
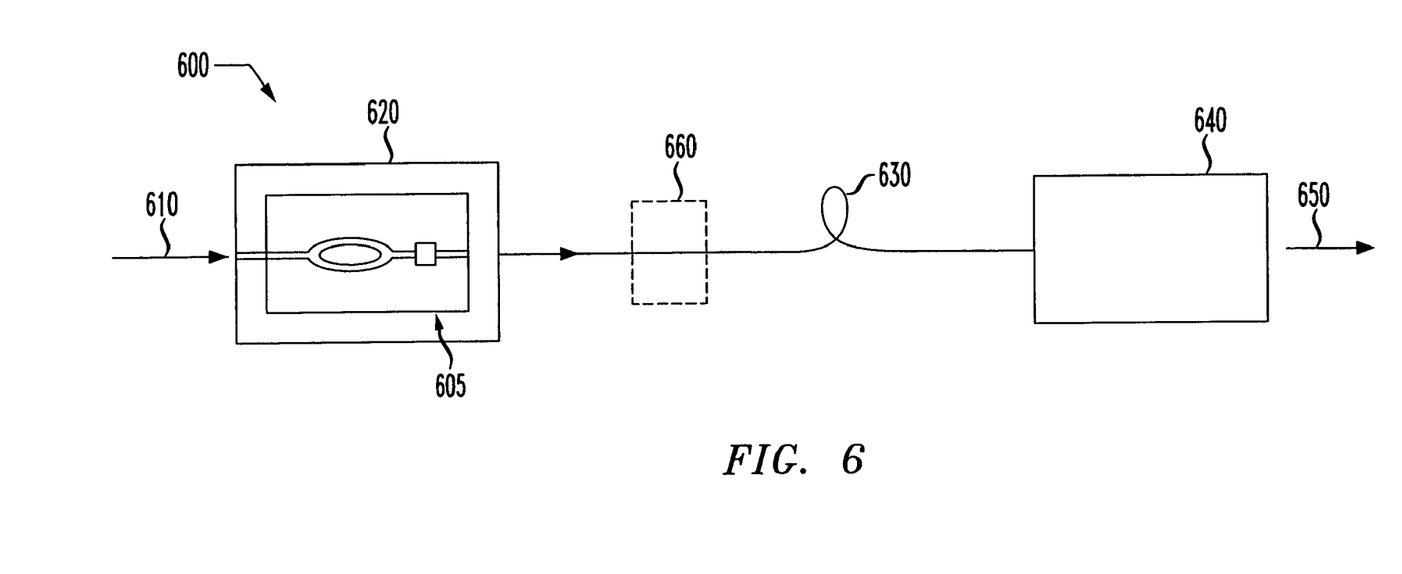
FIG. 6 illustrates another optical communications system, which may form one environment where an optical waveguide device, similar to the optical waveguide device illustrated in FIG. 5, may be included.

Turning briefly to FIG. 6, illustrated is another optical communications system 600, which may form one environment where an optical waveguide device 605, such as the optical waveguide device 505 illustrated in FIG. 5, may be included. The optical communications system 600, in the illustrative embodiment, includes an initial signal 610 entering a transmitter 620. The transmitter 620 receives the initial signal 610 and sends the resulting information across an optical fiber 630 to a receiver 640. The receiver 640 receives the information from the optical fiber 630, and provides an ultimate signal 650. As illustrated in FIG. 6, the completed optical waveguide device 605 may be included within the transmitter 620. However, the completed optical waveguide device 605 may also be included anywhere in the optical communications system 600, including the receiver 640. The optical communications system 600 is not limited to the devices previously mentioned. For example, the optical communications system 600 may include a source 660, such as a laser or a diode.

Although the present invention has been described in detail, those skilled in the art should understand that they can make various changes, substitutions and alterations herein without departing from the spirit and scope of the invention in its broadest form.

What is claimed is:

1. A method for manufacturing an optical waveguide device, comprising:
   providing an optical substrate; and
   placing a liquid onto the optical substrate and allowing the liquid to infiltrate the optical substrate to form an optical core.

2. The method as recited in claim 1 wherein allowing the liquid to infiltrate includes allowing the liquid to infiltrate by a capillary motion.

3. The method as recited in claim 1 wherein allowing the liquid to infiltrate the optical substrate to form an optical core includes allowing the liquid to infiltrate the optical substrate to form an optical core located within about 10 μm of an upper surface of the optical substrate.

4. The method as recited in claim 1 wherein providing an optical substrate includes providing an optical substrate comprising a free-volume material.

5. The method as recited in claim 4 wherein providing an optical substrate comprising a free-volume material includes providing an optical substrate comprising a xerogel material.

6. The method as recited in claim 1, further including setting the infiltrated liquid using photochemistry, electrochemistry, or a thermal treatment.

7. The method as recited in claim 1 wherein placing a liquid includes placing an organic monomer.

8. The method as recited in claim 1 wherein placing a liquid includes placing a liquid consisting essentially of an organic monomer.

9. The method as recited in claim 1 wherein placing a liquid includes stamping or printing the liquid on the optical substrate.

10. The method as recited in claim 1, further including maintaining the optical substrate and liquid at temperatures of less than about 200° C. while placing or allowing.

11. The method as recited in claim 1 wherein providing and placing includes providing an optical substrate having an index of refraction and placing includes placing a liquid, which as a composite with the optical substrate, has an index of refraction greater than the optical substrate.

12. An optical waveguide device, comprising:
   an optical substrate comprising a free-volume material; and
   a contrasting material located at least partially within a free volume of the free volume material, the contrasting material forming at least a portion of an optical core.

13. The optical waveguide device recited in claim 12 wherein the contrasting material has an index of refraction greater than the optical substrate.

14. The optical waveguide device as recited in claim 12 wherein the optical substrate comprises an inorganic material.

15. The optical waveguide device as recited in claim 12 wherein the optical substrate is a xerogel material.

16. The optical waveguide device as recited in claim 12 wherein the optical core is located within 10 μm of a surface of the optical substrate.

17. The optical waveguide device as recited in claim 12 wherein the optical substrate comprises a material having a porosity between about 20% and about 80%.

18. The optical waveguide device as recited in claim 12 wherein the contrasting material comprises an organic material.

19. The optical waveguide device as recited in claim 18 wherein the organic material comprises a polymerizable material.

20. The optical waveguide device as recited in claim 12 further including a second device located on the optical substrate.

21. The optical waveguide device as recited in claim 20 wherein the second device is selected from the group of devices consisting of:
   a waveguide;
   a reflector;
   an emitter;
   an optical cavity;
   a laser;
   a light-emitting diode; and
   a modulator.

22. The optical waveguide device as recited in claim 20 wherein the optical waveguide device forms at least a portion of the second device.

23. A method for manufacturing an optical communications device, comprising:
   forming an optical waveguide device, including;

providing an optical substrate; and placing a liquid onto the optical substrate and allowing the liquid to infiltrate the optical substrate to form an optical core; and optically coupling a second device to the optical waveguide device.

24. The method as recited in claim 23 wherein the second device is formed on the optical substrate.

25. The method as recited in claim 23 wherein the second device is selected from the group of devices consisting of:

a waveguide;

a reflector;

an emitter;

an optical cavity;

a laser;

a light-emitting diode; and a modulator.

26. The method as recited in claim 23 wherein the optical waveguide device forms at least a part of the second device.

\* \* \* \* \*